United States Patent [19]

Hirasa et al.

[11] Patent Number: 5,919,294
[45] Date of Patent: Jul. 6, 1999

[54] RECORDING LIQUID

[75] Inventors: Takashi Hirasa; Masahiro Yamada, both of Yokohama; Makoto Ishizu, Chigasaki, all of Japan

[73] Assignee: Mitsubishi Chemical Corporation, Tokyo, Japan

[21] Appl. No.: 08/841,393

[22] Filed: Apr. 30, 1997

[30] Foreign Application Priority Data

Apr. 30, 1996 [JP] Japan .................................. 8-109469

[51] Int. Cl.⁶ .................................................. C09D 11/02
[52] U.S. Cl. ............................................................ 106/31.9
[58] Field of Search .............................. 106/31.9, 31.85, 106/31.89, 472, 476

[56] References Cited

U.S. PATENT DOCUMENTS

| | | | |
|---|---|---|---|
| 4,164,423 | 8/1979 | Schumacher et al. | 106/31.9 |
| 4,751,069 | 6/1988 | Ducote et al. | 106/477 |
| 5,184,148 | 2/1993 | Suga et al. | 106/31.9 |
| 5,439,514 | 8/1995 | Kashiwazaki et al. | 106/31.9 |
| 5,538,548 | 7/1996 | Yamazaki | 106/31.9 |
| 5,718,746 | 2/1998 | Nagasawa et al. | 106/31.9 |
| 5,734,403 | 3/1998 | Suga et al. | 347/101 |

FOREIGN PATENT DOCUMENTS

| | | |
|---|---|---|
| 0 429 828 A1 | 6/1991 | European Pat. Off. . |
| 56-2356 | 1/1981 | Japan . |
| 3-97770 | 4/1991 | Japan . |
| 3-134073 | 6/1991 | Japan . |
| 4-18461 | 1/1992 | Japan . |
| 4-18467 | 1/1992 | Japan . |
| 4-149285 | 5/1992 | Japan . |
| 4-149286 | 5/1992 | Japan . |
| 4-189876 | 7/1992 | Japan . |
| 4-189878 | 7/1992 | Japan . |
| 5-125306 | 5/1993 | Japan . |
| 7-316480 | 12/1995 | Japan . |

OTHER PUBLICATIONS

Patent Abstracts of Japan, vol. 96, No. 4 Apr. 30, 1996 and JP 07 331141, Dec. 19, 1995—Abstract.

Patent Abstracts of Japan, vol. 15, No. 345 (C–0864), Sep. 3, 1991 and JP 03 134073 A, Jun. 7, 1991—Abstract.

*Primary Examiner*—Helene Klemanski
*Attorney, Agent, or Firm*—Oblon, Spivak, McClelland, Maier & Neustadt, P.C.

[57] ABSTRACT

A recording liquid comprising an aqueous medium and carbon black having the following physical properties:

① DBP oil absorption: at least 140 ml/100 g
② Volatile matter: at most 4% by weight.

13 Claims, No Drawings

RECORDING LIQUID

RECORDING LIQUID

The present invention relates to an aqueous recording liquid, particularly a black color type recording liquid for writing or ink jet printing.

Heretofore, a water-color ink containing an acid dye or a direct dye dissolved in an aqueous medium, or a solvent-type ink containing an oil-soluble dye dissolved in an organic solvent, has been used as a recording liquid for ink jet printing. The solvent type ink has a problem of environmental safety, and it is not suitable for use in offices. On the other hand, the water-color ink containing a water-soluble dye, has a problem that the record will be poor in water resistance, when recording is made on a pulp paper. The record with the ink also has a poor light resistance. The same problems are also found in the recording liquid for writing.

To solve such problems, it has been proposed to use an aqueous dispersion ink employing a carbon black with excellent water resistance and light resistance as a coloring material. However, the conventional aqueous dispersion ink of carbon black has a problem such that its storage stability is inadequate, its recording density of the record is low, or its jetting stability is poor.

Heretofore, channel black and furnace black have been well known as industrial carbon blacks. With respect to the physical properties of such industrial carbon blacks, it has been common that channel black has a high DBP oil absorption and a high content of volatile matter, and furnace black has a low DBP oil absorption and a low content of volatile matter. Carbon blacks having such physical properties have been used also for recording liquids.

Namely, JP-A-3-134073 discloses a recording liquid for ink jet recording which contains neutral to basic (pH7 to 10) furnace carbon black and a water-soluble resin for the purpose of improving the jetting stability, but this publication discloses nothing about the DBP oil absorption and volatile matter of the carbon black or the printing density. However, in reality, the carbon black disclosed does not satisfy either the DBP oil absorption or the volatile matter as specified by the present invention, whereby no adequate performance can be obtained.

Further, JP-A-3-210373 discloses a recording liquid comprising acidic carbon black and a water-soluble resin and designed to improve the printing density. However, carbon blacks differing substantially in the volatile matter from 3.5 to 8% by weight and in the DBP oil absorption from 45 to 170 ml/100 g, are equally described. In reality, such carbon blacks do not satisfy either the DBP oil absorption or the volatile matter as specified in the present invention. Further, there is no disclosure with respect to the relation between the printing density and the DBP oil absorption. Besides, the stability during a storage for a long period of time at a high temperature is inadequate, whereby it is required to carefully chose the dispersing agent for use.

Further, JP-A-7-331141 discloses a recording liquid for ink jet recording employing a carbon black having a DBP oil absorption of 75 ml/100 g. However, there is no disclosure with respect to the volatile matter in the carbon black. In reality, the volatile matter is a highly volatile component which does not satisfy the range specified by the present invention, whereby no adequate performance can be obtained.

On the other hand, JP-A-2-276872, JP-A-2-276873, JP-A-2-276875, JP-A-3-66768, JP-A-3-140377, JP-A-4-57859, JP-A-4-57860, JP-A-4-57861, JP-A-4-57862, JP-A-4-57863, JP-A-4-58864, JP-A-4-57865, JP-A-4-59879, JP-A-4-332773 and JP-A-5-247391 propose to incorporate a water-soluble dye such as an azo dye or a phthalocyanine dye for the purpose of overcoming such problems. However, since a water-soluble dye is used, there is a problem in the water resistance.

As described above, conventional aqueous dispersion type recording liquids of carbon black have not yet accomplished industrially fully satisfactory performance.

It is an object of the present invention to provide an aqueous dispersion ink employing carbon black, which, when recorded on pulp paper by writing or ink jet recording, gives a record with excellent water resistance, high recording density, high reliability, good printing quality, excellent fastnesses and excellent light resistance, and which is excellent in the stability even when stored at a high temperature for a long period of time. It is another object of the present invention to provide an aqueous dispersion ink employing carbon black, which is excellent in jetting durability, such that even in a case of a so-called heating type ink jet printer whereby ink jet recording is carried out by utilizing a change in the state of a recording liquid by heating, precipitation (cogation) of impurities on an electrode plate as the heating means, is very little.

As a result of various studies for improving the printing density, water resistance, storage stability and jetting stability of an aqueous pigment-dispersed black ink for a recording liquid, the present inventors have found it possible to improve not only the printing density of a printed record but also the storage stability and jetting stability by using a recording liquid comprising an aqueous medium and carbon black having certain specific physical properties. The present invention has been accomplished on the basis of this discovery.

The present invention provides a recording liquid comprising an aqueous medium and carbon black having the following physical properties:

① DBP oil absorption: at least 140 ml/100 g
② Volatile matter: at most 4% by weight Now, the present invention will be described in detail with reference to the preferred embodiments.

The DBP oil absorption of the carbon black of the present invention is usually within a range of at least 140 ml/100 g, preferably at least 150 ml/100 g. The upper limit is usually 280 ml/100 g. The volatile matter is usually within a range of at most 4% by weight, preferably at most 3% by weight. By limiting the volatile matter within such a range, jetting durability can be improved, such that particularly in the case of a heating type ink jet printer, precipitation (cogation) of impurities on an electrode plate as the heating means can be minimized. With respect to the pH, if carbon black having pH 7 to 14 is used, the storage stability of the recording liquid will be excellent without increase of the viscosity of the carbon black during storage of the recording liquid for a long period of time. Here, carbon black having pH 7 to 14 is so-called neutral carbon black or alkaline carbon black. Further, the BET specific surface area is preferably at least 100 $m^2/g$, more preferably at least 150 $m^2/g$, most preferably within a range of 200 to 700 $m^2/g$. The primary particle size is preferably at most 24 nm, more preferably at most 18 nm.

Further, it is preferred to use furnace black as the carbon black.

Here, the DBP oil absorption of the carbon black is a value measured by JIS K6221 Method A, and the pH is a value obtained by adding 100 ml of distilled water to 10 g of a sample, boiling the mixture on a hot plate for 10 minutes, cooling it to room temperature, then removing the supernatant, and measuring the pH of the sludge by means of a glass electrode pH meter. The volatile matter is a value measured by a method stipulated in JIS K6221, and the BET specific surface area is a value obtained in accordance with ASTM D3037 Method D. The primary particle size is an arithmetic mean diameter obtained by means of an electron microscope.

When the recording liquid of the present invention having such characteristics is used for printing, it is possible to obtain a record with a high density, whereby the record will have a high printing quality and excellent fastnesses such as light resistance as well as water resistance, and the recording liquid will be excellent in the storage stability and jetting stability.

The carbon black to be used for the recording liquid of the present invention may be the one obtained by chemically treating carbon black (oxidation treatment, fluorination treatment, etc.) or the one obtained by physically or chemically binding e.g. a dispersing agent or a surface active agent to carbon black (the one treated by graft treatment, the one having a dispersing agent preliminarily adsorbed before dispersion or the one treated by microencapsulation) so long as it has the above-mentioned physical properties. The volatile matter in such surface-treated carbon black is a value measured by suspending such carbon black in a large amount of an aqueous hydrochloric acid solution under an acidic condition of at most pH 1, followed by filtering and drying, and then measuring the volatile matter in accordance with the above-mentioned method (JIS K6221).

Commercially available products useful as the carbon black of the present invention are of very limited special grades, such as products of Mitsubishi Chemical Corporation represented by tradenames of #3050B, #3350B, #3250 and #3750, a product of Columbian Co. represented by a tradename of Conductex 975 ULTRA, products of Cabot Co. represented by tradenames of VULCAN XC72R and VULCAN XC72. Further, the one having such carbon black chemically treated (e.g. fluorination treatment) or the one having a dispersing agent or a surface active agent physically or chemically bonded to carbon black (graft carbon black, a carbon black having a dispersing agent preliminarily adsorbed prior to dispersion or the one treated by microencapsulation) may be employed so long as it satisfies the above conditions.

A dispersing agent may be incorporated to the recording liquid of the present invention. Useful dispersing agents include, for example, various anionic surfactants, nonionic surfactants, cationic surfactants, amphoteric surfactants, and polymer dispersants. The anionic surfactants include, for example, fatty acid salts, alkyl sulfates, alkylbezene sulfonates, alkylnaphthalene sulfonates, alkylsulfosuccinates, alkyldiphenylether disulfonates, alkyl phosphates, polyoxyethylene alkylsulfates, polyoxyethylene alkylallylsulfates, alkane sulfonates, naphthalene sulfonic acid-formalin condensation products, polyoxyethylenealkyl phosphates, and α-olefin sulfonates. The nonionic surfactants include, for example, polyoxyethylene alkyl ethers, polyoxyethylene alkylarylethers, polyoxyethylene derivatives, oxyethylene/oxypropylene block copolymers, sorbitan fatty acid esters, polyoxyethylene sorbitan fatty acid esters, polyoxyethylene sorbitol fatty acid esters, glycerol fatty acid esters, polyoxyethylene fatty acid esters, and polyoxyethylene alkylamines. The cationic surfactants and amphoteric surfactants include, for example, alkylamines, quaternary ammonium salts, alkylbetaines and aminoxides.

Further, the polymer dispersants include, for example, polyacrylic acid, a styrene/acrylic acid copolymer, a styrene/acrylic acid/acrylate copolymer, a styrene/maleic acid copolymer, a styrene/maleic acid/acrylate copolymer, a styrene/methacrylic acid copolymer, a styrene/methacrylic acid/acrylate copolymer, a styrene/maleic acid half ester copolymer, an α-olefin/allyl ether/maleic acid copolymer, a styrene/styrenesulfonic acid copolymer, a vinylnaphthalene/maleic acid copolymer, a vinylnaphthalene/acrylic acid copolymer and their salts (alkali metal salts such as lithium, sodium and potassium salts, and organic amine salts such as triethanolamine, monoethanolamine, 2-amino-2-propylalcohol salts). Among them, anionic surfactants, cationic surfactants and polymer dispersants are particularly preferred.

The aqueous medium to be used for the recording liquid of the present invention is composed mainly of water, but it is preferred to incorporate a water-soluble organic solvent to water. The water-soluble organic solvent may, for example, be glycols such as ethylene glycol, propylene glycol, butylene glycol, diethylene glycol, triethylene glycol, polyethylene glycol (#200, #300, #400, #600) and glycerol, alkyl ethers of such glycols, N-methylpyrrolidone, 1,3-dimethylimidazolidinone, thiodiglycol, 2-pyrrolidone, sulforane, dimethylsulfoxide, diethanolamine, triethanolamine, ethanol and isopropanol.

To the recording liquid of the present invention, a urea compound (a urea derivative or thio urea) may be incorporated, as the case requires.

Further, to the recording liquid of the present invention, a water-soluble resin, a fungicide, a bactericide or a pH-controlling agent may be incorporated, as the case requires, in addition to the above described components.

Each of the carbon black, the dispersing agent and the organic solvent may consist of a single substance, but may be a combination of two or more substances in some cases, so that better effects can be obtained.

Carbon black is used usually within a range of from 1 to 10% by weight, preferably from 3 to 8 % by weight, to the total weight of the recording liquid. When a dispersing agent is used, it is preferably incorporated within a range of from 3 to 100% by weight, more preferably from 20 to 80% by weight, to the weight of the carbon black. The amount of the water-soluble organic solvent in the recording liquid is preferably within a range of from 5 to 30% by weight, more preferably from 10 to 20% by weight. When a urea compound is used, it is usually incorporated in an amount of at most 20 wt %, preferably at most 10 wt %, to the recording liquid. When other additives are to be used, they may be incorporated in the respective effective amounts not to impair the performance of the recording liquid. Usually, they are incorporated in their total amount of at most 2% by weight, preferably from 0.1 to 2% by weight, more preferably from 0.1 to 1% by weight.

To prepare the recording liquid of the present invention, firstly the above described respective components are mixed, and carbon black is pulverized into fine particles and dispersed by means of a dispersing apparatus. As the dispersing apparatus, a ball mill, a roll mill or a sand grind mill, as well as a jet mill such as a nanomizer or an altemizer capable of carrying out pulverization treatment without employing media, may, for example, be employed. Particularly preferred is a sand grind mill or a jet mill free from contamination due to media. After this grinding and dispersing treatment, coarse particles will be removed by means of a filtration apparatus or a centrifugal separator. Components other than the carbon black, the dispersing agent and water, may be added after the grinding and dispersing treatment.

In the present invention, the maximum value (the upper limit in the particle size distribution) of the particle size of carbon black (representing the particle size of agglomerates in a state where carbon black is present in the recording liquid) in the recording liquid, is 3 μm, preferably 1 μm. The average particle size (the volume average particle size: the value where the volume is 50%, hereinafter referred to as "D-ave") is preferably within a range of from 0.02 to 1.0 μm, more preferably from 0.05 to 0.5 μm.

Further, pulverization and dispersion treatment can efficiently be carried out by preparing carbon black at a high concentration. Accordingly, it is preferred to conduct pulverization and dispersion treatment at a high concentration (e.g. the concentration of carbon black in the dispersion is at a level of from 5 to 20% by weight) and to dilute the treated liquid with an aqueous medium to adjust it to the final concentration of the recording liquid as mentioned above.

When the recording liquid of the present invention is used for printing, it is possible to obtain a record with a high density and excellent printing quality, and it is possible to obtain a record having excellent fastnesses such as light resistance in addition to water resistance. Further, it is also excellent in the storage stability as a recording liquid. Especially when used in a heating type ink jet printer, it is excellent in jetting durability, such that precipitation (cogation) of impurities on an electrode plate as the heating means can be minimized.

Further, when carbon black having a pH of from 7 to 14, is employed, the storage stability will be excellent without increase of the particle size of carbon black used even during the storage of the recording liquid for a long period of time.

Now, the present invention will be described in further detail with reference to Examples. However, it should be understood that the present invention is by no means restricted to such specific Examples. In the following Examples, "parts" and "%" are "parts by weight" and "% by weight", respectively.

EXAMPLE 1

| Preparation of recording liquid | |
| --- | --- |
| Composition of recording liquid | Amount (parts) |
| Glycerol | 8 |
| Ethylene glycol | 7 |
| Styrene/styrenesulfonic acid copolymer Na salt (molar ratio = 7/3, weight average molecular weight (Mw) = 4,300) | 1 |
| Carbon black A (see Table 2 for the physical property values) | 5 |
| Deionized water | 23 |
| Total | 44 |

The above-identified components were taken into a cylindrical container with the interior coated with a urethane resin and subjected to pulverization treatment for 12 hours by means of a sand grinder together with 67 parts of zirconia beads having an average size of 0.5 mm. The obtained liquid was diluted with 56 parts of deionized water and stirred. Then, it was filtered under pressure by means of No. 5C filter paper. The liquid thereby obtained was used as a recording liquid.

Printing Test

Using the recording liquid obtained by the method disclosed in the above Example, ink jet recording was carried out on an electrophotographic paper (Xerox 4024 paper, tradename, manufactured by Xerox Corporation) by means of a heating type ink jet printer (Desk Writer C, manufactured by Hewlett Packard), whereby stable and good jetting performance was obtained without clogging, and a printed product having good printing quality was obtained.

Evaluation of Printing Record Density

The density of the printed product obtained by the above printing test was-measured by means of a Macbeth reflection densitometer (RD914, manufactured by Macbeth Co.). The results of evaluation are shown in the following Table 1.

Water Resistance Test

The printed product obtained in the printing test, was immersed in city water in a beaker for 5 seconds. The printed product was dried, and the presence or absence of print smudging was visually evaluated. The results were evaluated under the following standards and shown in Table 1.

Evaluation standards:
 ○: No substantial print smudging observed.
 Δ: Slight print smudging observed, but practically no problem.
 x: Substantial print smudging observed.

Light Resistance Test

The printed product was irradiated for 100 hours by means of a xenon fade meter (manufactured by Suga Shikenki K.K.), whereupon discoloration was visually evaluated. The results were evaluated under the following standards and shown in Table 1.

Evaluation standards:
 ○: Good
 Δ: Slight discoloration observed, but practically no problem
 x: Substantial discoloration observed Cogation Test Using the recording liquid obtained by the method disclosed in the above Example, solid printing of 15 cm×25 cm was carried out on 25 sheets of electrophotographic paper (Xerox 4024 paper, manufactured by Xerox Corporation) by means of a heating type ink jet printer (Desk Writer C, manufactured by Hewlett Packard). Then, the head was gently dismounted, and the electrode plate was gently washed with deionized water. After drying, deposits on the electrode plate were observed by an optical microscope. The results were evaluated under the following standards and shown in the following Table 1.

Evaluation standards;
 ○: Slight deposits observed, but practically no problem
 Δ: Some deposits observed
 x: Substantial deposits observed

EXAMPLE 2

| Preparation of recording liquid | |
| --- | --- |
| Composition of recording liquid | Amount (parts) |
| Glycerol | 5 |
| Ethylene glycol | 10 |
| Polystar S2-1020 (non volatile matter) (styrene/maleic acid salt copolymer, manufactured by Nippon Oil & Fat Co., Ltd.) | 1.5 |
| Carbon black B (see Table 2 for the physical property values) | 5 |
| Deionized water | 22.5 |
| Total | 44 |

The above-identified components were taken into a cylindrical container with the interior coated with a urethane resin and subjected to pulverization treatment for 12 hours by means of a sand grinder together with 67 parts of zirconia beads having an average size of 0.5 mm. The obtained liquid was diluted with 56 parts of deionized water and stirred. Then, it was filtered under pressure by means of No. 5C filter paper. The liquid thereby obtained was used as a recording liquid.

The printing test, water resistance test, light resistance test, cogation test and printing density evaluation were carried out in the same manners as in Example 1. The results of evaluation are shown in the following Table 1. The results of the printing test were the same as in Example 1.

EXAMPLE 3

| Preparation of recording liquid | |
| --- | --- |
| Composition of dispersion | Amount (parts) |
| Diethylene glycol | 8 |
| Ethylene glycol | 5 |
| Polystar S2-1020 (non volatile matter) (manufactured by Nippon Oil & Fat Co., Ltd.) | 2 |
| Carbon black C (see Table 2 for the physical property values) | 6 |
| Deionized water | 23 |
| Total | 44 |

The above-identified components were taken into a cylindrical container with the interior coated with a urethane resin and subjected to pulverization treatment for 12 hours by means of a sand grinder together with 67 parts of zirconia beads having an average size of 0.5 mm. The obtained liquid was diluted with 56 parts of deionized water and stirred. Then, it was filtered under pressure by means of No. 5C filter paper. The liquid thereby obtained was used as a recording liquid.

The printing test, water resistance test, light resistance test, cogation test and printing density evaluation were carried out in the same manners as in Example 1. The results of evaluation are shown in the following Table 1. Further, the results of the printing test were the same as in Example 1.

EXAMPLE 4

| Preparation of recording liquid | |
| --- | --- |
| Composition of recording liquid | Amount (parts) |
| Glycerol | 8 |
| N-methylpyrrolidone | 3 |
| Triethanolamine | 3 |
| Styrene/styrenesulfonic acid salt copolymer (molar ratio = 1/1, weight average molecular weight (Mw) = 8,000) | 1 |
| Carbon black D (see Table 2 for the physical property values) | 5 |
| Deionized water | 24 |
| Total | 44 |

The above-identified components were taken into a cylindrical container with the interior coated with a urethane resin and subjected to pulverization treatment for 12 hours by means of a sand grinder together with 67 parts of zirconia beads having an average size of 0.5 mm. The obtained liquid was diluted with 56 parts of deionized water and stirred. Then, it was filtered under pressure by means of No. 5C filter paper. The liquid thereby obtained was used as a recording liquid.

The printing test, water resistance test, light resistance test, cogation test and printing density evaluation were carried out in the same manners as in Example 1. The results of evaluation are shown in the following Table 1. Further, the results of the printing test were the same as in Example 1.

EXAMPLE 5

| Preparation of recording liquid | |
| --- | --- |
| Composition of recording liquid | Amount (parts) |
| Glycerol | 7 |
| N-methylpyrrolidone | 7 |
| α-olefin (average carbon number: 46)/ pentaethylene glycol methylallyl ether/ dipotassium maleate copolymer (molar ratio = 4:6:10, weight average molecular weight Mw = 9,000) | 3.5 |
| Carbon black E (see Table 2 for the physical property values) | 5 |
| Deionized water | 21.5 |
| Total | 44 |

The above-identified components were taken into a cylindrical container with the interior coated with a urethane resin and subjected to pulverization treatment for 12 hours by means of a sand grinder together with 67 parts of zirconia beads having an average size of 0.5 mm. The obtained liquid was diluted with 56 parts of deionized water and stirred. Then, it was filtered under pressure by means of No. 5C filter paper. The liquid thereby obtained was used as a recording liquid.

The printing test, water resistance test, light resistance test, cogation test and printing density evaluation were carried out in the same manners as in Example 1. The results of evaluation are shown in the following Table 1. Further, the results of the printing test were the same as in Example 1.

Comparative Example 1

A recording liquid was prepared in the same manner as in Example 1 except that instead of using carbon black A, Color Black FW18 (tradename for carbon black, manufactured by Degussa Co., see Table 2 for the physical property values) was used as the carbon black.

The printing test, water resistance test, light resistance test, cogation test and printing density evaluation were carried out in the same manners as in Example 1. The results of evaluation are shown in the following Table 1. Further, the results of the printing test were the same as in Example 1.

Comparative Example 2

A recording liquid was prepared in the same manner as in Example 2 except that instead of using carbon black B, Color Black S170 (tradename for carbon black, manufactured by Degussa Co., see Table 2 for the physical property values) was used as the carbon black.

The printing test, water resistance test, light resistance test, cogation test and printing density evaluation were carried out in the same manners as in Example 2. The results of evaluation are shown in the following Table 1. Further, the results of the printing test were the same as in Example 1.

Comparative Example 3

A recording liquid was prepared in the same manner as in Example 1 except that instead of using carbon black A, MCF88 (tradename for carbon black, manufactured by Mitsubishi Chemical Corporation, see Table 2 for the physical property values) was used as the carbon black.

The printing test, water resistance test, light resistance test, cogation test and printing density evaluation were carried out in the same manners as in Example 2. The results of evaluation are shown in the following Table 1. Further, the results of the printing test were the same as in Example 1.

TABLE 1

|  | Water resistance test | Light resistance test | Cogation test | Printing density |
| --- | --- | --- | --- | --- |
| Example 1 | ○ | ○ | Δ | 1.34 |
| Example 2 | ○ | ○ | Δ | 1.36 |
| Example 3 | ○ | ○ | Δ | 1.37 |
| Example 4 | ○ | ○ | Δ | 1.35 |
| Comparative Example 1 | ○ | ○ | X | 1.32 |
| Comparative Example 2 | ○ | ○ | X | 1.33 |
| Comparative Example 3 | ○ | ○ | Δ | 1.16 |

TABLE 2

|  | Particle size (nm) | Specific surface area (m$^2$/g) | DBP oil absorption (ml/100 g) | pH | FC or CC | Volatile matter (wt %) |
| --- | --- | --- | --- | --- | --- | --- |
| Carbon black A | 16 | 245 | 150 | 7.0 | FC | 1.0 |
| Carbon black B | 18 | 163 | 162 | 7.0 | FC | 1.5 |
| Carbon black C | 16 | 238 | 168 | 3.5 | FC | 1.2 |
| Carbon black D | 18 | 200 | 165 | 8.5 | FC | 1.0 |
| Carbon black E | 15 | 262 | 147 | 8.0 | FC | 1.0 |
| Color Black FW18 | 15 | 260 | 160 | 4.0 | CC | 4.5 |
| Color Black S170 | 17 | 200 | 150 | 4.0 | CC | 4.5 |
| MCF88 | 18 | 200 | 54 | 8.0 | FC | 1.5 |

FC: Furnace Carbon Black
CC: Channel Carbon Black

EXAMPLE 6

Preparation of recording liquid

| Composition of recording liquid | Amount (parts) |
| --- | --- |
| Glycerol | 16 |
| Ethylene glycol | 18 |
| Liporan PB-800 (tradename, manufactured by Lion K.K.) | 2 |
| Carbon black #3350B (tradename, manufactured by Mitsubishi Chemical Corporation) | 14 |
| Deionized water | 50 |
| Total | 100 |

The above-identified components were taken into a stainless steel container and subjected to pulverization treatment for 60 hours by means of a sand grinder together with 152 parts of glass beads having an average size of 0.5 mm. The obtained liquid was diluted with 127 parts of deionized water and stirred. Then, it was filtered under pressure by means of No. 5C filter paper. The liquid thereby obtained was used as a recording liquid.

Measurement of Particle Size Distribution

The particle size distribution of the recording liquid obtained by the method disclosed in the above Example was measured by means of a laser doppler type particle size distribution meter (Microtrac UPA, sold by Nikkiso). The results are shown by D-ave ($\mu$m) in the following Table 3. The measurement was carried out without diluting the recording liquid.

Storage Stability Test of the Recording Liquid

① The recording liquid was sealed in a Teflon container and stored at 70° C. for 1 month, whereupon the presence or absence of gelation or precipitation was visually evaluated. The results were evaluated under the following standards and shown in the Table 1.

Evaluation standards:

○: No substantial gelation or precipitation observed.

Δ: Slight gelation-or precipitation observed, but practically no problem.

x: Substantial gelation or precipitation observed.

② The above recording liquid stored at 70° C. for 1 month, was returned to room temperature, and the particle size distribution was measured in the same manner by using the same meter, and D-ave ($\mu$m) is shown in the following Table 3. Further, the printing test, printing density evaluation, water resistance test and light resistance test were carried out in the same manner as in Example 1, and the results are shown in Table 3. Further, the results of the printing test were the same as in Example 1.

With the recording liquid of this Example, no substantial change in the average particle size was observed even after storage for 1 month, thus indicating that it is a stable recording liquid.

EXAMPLE 7

Preparation of recording liquid

| Composition of recording liquid | Amount (parts) |
| --- | --- |
| Glycerol | 16 |
| Ethylene glycol | 18 |
| Polystar S2-1020 (non volatile matter) (tradename for styrene/maleic acid salt copolymer, manufactured by Nippon Oil & Fat Co., Ltd.) | 3 |

-continued

Preparation of recording liquid

| Composition of recording liquid | Amount (parts) |
|---|---|
| Carbon black VULCAN XC72R (tradename, manufactured Cabot CO.) | 7 |
| Deionized water | 56 |
| Total | 100 |

The above-identified components were taken into a stainless steel container and subjected to pulverization treatment for 60 hours by means of a sand grinder together with 152 parts of glass beads having an average size of 0.5 mm. The obtained liquid was diluted with 127 parts of deionized water and stirred. Then, it was filtered under pressure by means of No. 5C filter paper. The liquid thereby obtained was used as a recording liquid.

Using this recording liquid, the particle size distribution measurement, printing test, printing density evaluation, water resistance test, light resistance test and storage stability test of the recording liquid were carried out in the same manners as in Example 6. The results are shown in Table 3. Further, the results of the printing test were the same as in Example 6.

EXAMPLE 8

Preparation of recording liquid

| Composition of dispersion | Amount (parts) |
|---|---|
| Glycerol | 16 |
| Ethylene glycol | 18 |
| Polystar S2-1020 (non volatile matter) | 2 |
| Carbon black #3050B (tradename, manufactured by Mitsubishi Chemical Corporation) | 11 |
| Deionized water | 53 |
| Total | 100 |

The above-identified components were taken into a stainless steel container and subjected to pulverization treatment for 60 hours by means of a sand grinder together with 152 parts of glass beads having an average size of 0.5 mm. The obtained liquid was diluted with 127 parts of deionized water and stirred. Then, it was filtered under pressure by means of No. 5C filter paper. The liquid thereby obtained was used as a recording liquid.

Using this recording liquid, the particle size distribution measurement, printing test, printing density evaluation, water resistance test, light resistance test and storage stability test of the recording liquid were carried out in the same manners as in Example 6. The results are shown in Table 3. Further, the results of the printing test were the same as in Example 6.

EXAMPLE 9

Preparation of recording liquid

| Composition of recording liquid | Amount (parts) |
|---|---|
| Glycerol | 18 |
| Isopropyl alcohol | 11 |

-continued

Preparation of recording liquid

| Composition of recording liquid | Amount (parts) |
|---|---|
| Triethanolamine | 7 |
| Styrene/styrenesulfonic acid salt copolymer (molar ratio = 1/1, weight average molecular weight = about 2,800) | 5 |
| Carbon black #3750 (tradename, manufactured by Mitsubishi Chemical Corporation | 7 |
| Deionized water | 52 |
| Total | 100 |

The above-identified components were taken into a stainless steel container and subjected to pulverization treatment for 60 hours by means of a sand grinder together with 152 parts of glass beads having an average size of 0.5 mm. The obtained liquid was diluted with 127 parts of deionized water and stirred. Then, it was filtered under pressure by means of No. 5C filter paper. The liquid thereby obtained was used as a recording liquid.

Using this recording liquid, the particle size distribution measurement, printing test, printing density evaluation, water resistance test, light resistance test and storage stability test of the recording liquid were carried out in the same manners as in Example 6. The results are shown in Table 3. Further, the results of the printing test were the same as in Example 6.

EXAMPLE 10

Preparation of recording liquid

| Composition of recording liquid | Amount (parts) |
|---|---|
| Polyethylene glycol #300 | 11 |
| 2-Pyrrolidone | 11 |
| N-methyl-2-pyrrolidone | 4.5 |
| α-olefin (average carbon number: 46)/ pentaethylene glycol methylallyl ether/ dipotassium maleate copolymer (molar ratio = 4:6:10, weight average molecular weight Mw = 9,000) | 7.5 |
| Carbon black #3350B (tradename, manufactured by Mitsubishi Chemical Corporation) | 11 |
| Deionized water | 55 |
| Total | 100 |

The above-identified components were taken into a stainless steel container and subjected to pulverization treatment for 60 hours by means of a sand grinder together with 152 parts of glass beads having an average size of 0.5 mm. The obtained liquid was diluted with 127 parts of deionized water. Then, it was filtered under pressure by means of No. 5C filter paper. The liquid thereby obtained was used as a recording liquid.

Using this recording liquid, the particle size distribution measurement, printing test, printing density evaluation, water resistance test, light resistance test and storage stability test of the recording liquid were carried out in the same manners as in Example 6, and the results are shown in Table 3. Further, the results of the printing test were the same as in Example 6.

Comparative Example 4

A recording liquid was prepared in the same manner as in Example 6 except that instead of using #3350B, Color Black FW1 (tradename for carbon black, manufactured by Degussa Co., the one disclosed in JP-A-4-210373, see Table 4 for the physical property values) was used as the carbon black.

Using this recording liquid, the particle size distribution measurement, printing test, printing density evaluation, water resistance test, light resistance test and storage stability test of the recording liquid were carried out in the same manners as in Example 6. The results are shown in Table 3. Further, the results of the printing test were the same as in Example 6.

Comparative Example 5

A recording liquid was prepared in the same manner as in Example 7 except that instead of using VULCAN XC72R, Color Black S170 (tradename for carbon black, manufactured by Degussa Co., the one disclosed in JP-A-4-210373, see Table 4 for the physical property values) was used as the carbon black.

Using this recording liquid, the particle size distribution measurement, printing test, printing density evaluation, water resistance test, light resistance test and storage stability test of the recording liquid were carried out in the same manners as in Example 6. The results are shown in Table 3. Further, the results of the printing test were the same as in Example 6.

Comparative Example 6

A recording liquid was prepared in the same manner as in Example 6 except that instead of using #3350B, MCF88 (tradename for carbon black, manufactured by Mitsubishi Chemical Corporation, see Table 4 for the physical property values) was used as the carbon black.

Using this recording liquid, the particle size distribution measurement, printing test, printing density evaluation, water resistance test, light resistance test and storage stability test of the recording liquid were carried out in the same manners as in Example 5. The results are shown in Table 3.

Further, the results of the printing test were the same as in Example 6.

TABLE 3

| | Water resistance test | Light resistance test | Particle size distribution (D-ave (μm)) | Storage stability ① | Storage stability ② | Printing density |
|---|---|---|---|---|---|---|
| Example 6 | ○ | ○ | 0.152 | ○ | 0.150 | 1.35 |
| Example 7 | ○ | ○ | 0.259 | ○ | 0.254 | 1.38 |
| Example 8 | ○ | ○ | 0.331 | ○ | 0.335 | 1.34 |
| Example 9 | ○ | ○ | 0.254 | ○ | 0.252 | 1.37 |
| Example 10 | ○ | ○ | 0.149 | ○ | 0.151 | 1.34 |
| Comparative Example 4 | ○ | ○ | 0.160 | ○ | 0.452 | 1.32 |
| Comparative Example 5 | ○ | ○ | 0.138 | ○ | 0.411 | 1.34 |
| Comparative Example 6 | ○ | ○ | 0.092 | ○ | 0.090 | 1.15 |

TABLE 4

| Tradename of carbon black | Particle size (nm) | Specific surface area (m²/g) | DBP oil absorption (ml/100 g) | pH | FC or CC | Volatile matter (wt %) |
|---|---|---|---|---|---|---|
| #3050B | 40 | 50 | 180 | 7.0 | FC | 1.0 |
| #3350B | 18 | 137 | 165 | 7.0 | FC | 1.3 |
| #3250 | 28 | 240 | 170 | 7.0 | FC | 1.0 |
| #3750 | 28 | 800 | 210 | 7.0 | FC | 1.0 |
| Conductex 975 ULTRA | 21 | 270 | 165 | 7.0 | FC | 1.0 |
| VULCAN XC72R | 30 | 254 | 188 | 7.0 | FC | 1.5 |
| VULCAN XC72 | 30 | 254 | 178 | 7.0 | FC | 1.5 |
| Color Black S170 | 17 | 200 | 150 | 4.0 | CC | 4.5 |
| Color Black FW1 | 13 | 320 | 170 | 4.0 | CC | 6.0 |
| Color Black FW200 | 13 | 460 | 150 | 2.5 | CC | 21.5 |
| Special Black 6 | 17 | 300 | 160 | 2.5 | CC | 18.0 |
| MCF88 | 18 | 200 | 54 | 8.0 | FC | 1.5 |

In the above Table 4, the particle size is the primary particle size (nm), FC is Furnace Carbon Black, and CC is Channel Carbon Black As described in the foregoing, by using the recording liquid of the present invention, it is possible to obtain an excellent black-colored record which is excellent in water resistance even when recorded on a usual pulp paper and which has a high recording density, a high printing quality and excellent fastnesses such as light resistance in addition to the water resistance, and the recording liquid is excellent in the jetting stability. With the above-mentioned properties, the recording liquid of the present invention is useful not only for ink jet or for writing, but also as a recording liquid for other applications.

The recording liquid of the present invention is useful particularly for ink jet recording. The ink jet recording method is not particularly limited, and it may be the one employing electrical energy or the one employing heat energy. It is particularly advantageous to use it for a heating type ink jet printer, whereby the liquid is excellent in the jetting durability such that precipitation (cogation) of impurities on the electrode plate as the heating means, is minimum.

We claim:

1. A recording liquid comprising an aqueous medium and carbon black having the following physical properties:
   ① DBP oil absorption: at least 140 ml/100 g and
   ② Volatile matter: at most 4% by weight.

2. The recording liquid according to claim 1, which comprises an aqueous medium and carbon black having the following physical properties:
   ① DBP oil absorption: at least 140 ml/100 g;
   ② Volatile matter: at most 4% by weight, and
   ③ pH: 7 to 14.

3. The recording liquid according to claim 1, wherein the volatile matter in the carbon black is at most 3% by weight.

4. The recording liquid according to claim 1, wherein the carbon black has the following additional physical property:
   BET specific surface area: at least 100 $m^2$/g.

5. The recording liquid according to claim 1, wherein the carbon black has the following additional physical property:
   Primary particle size: at most 24 nm.

6. The recording liquid according to claim 1, wherein said carbon black is furnace black.

7. The recording liquid according to claim 1, which further contains a dispersing agent.

8. The recording liquid according to claim 7, wherein said dispersing agent is selected from the group consisting of anionic surfactants, nonionic surfactants, cationic surfactants, amphoteric surfactants and polymer dispersants.

9. The recording liquid according to claim 1, wherein said aqueous medium comprises water as the main component and a water-soluble organic solvent.

10. The recording liquid according to claim 1, which further contains at most 2% by weight of an additive selected from the group consisting of water-soluble resins, fungicides, bactericides and pH-controlling agents.

11. The recording liquid according to claim 1, wherein said carbon black is present in an amount of from 1 to 10% by weight based on the total weight of the recording liquid.

12. The recording liquid according to claim 1, wherein the average volume particle size of the carbon black in the recording liquid is within a range of from 0.02 to 1.0 µm.

13. The recording liquid according to claim 7, wherein said dispersing agent is present in an amount of from 3 to 100% by weight based on the weight of the carbon black.

* * * * *